(12) United States Patent
Kojima

(10) Patent No.: US 8,482,945 B2
(45) Date of Patent: Jul. 9, 2013

(54) POWER CONVERTER WITH MAGNETIC RECOVERY SWITCH

(75) Inventor: Naoto Kojima, Tokyo (JP)

(73) Assignee: MERSTech, Inc., Tokyo (JP)

( * ) Notice: Subject to any disclaimer, the term of this patent is extended or adjusted under 35 U.S.C. 154(b) by 255 days.

(21) Appl. No.: 13/062,512

(22) PCT Filed: Sep. 26, 2008

(86) PCT No.: PCT/JP2008/067553
§ 371 (c)(1),
(2), (4) Date: Mar. 6, 2011

(87) PCT Pub. No.: WO2010/035338
PCT Pub. Date: Apr. 1, 2010

(65) Prior Publication Data
US 2011/0176343 A1  Jul. 21, 2011

(51) Int. Cl.
*H02H 7/125* (2006.01)
*H02M 7/68* (2006.01)
(52) U.S. Cl.
USPC ............ 363/53; 363/52; 363/81; 363/82; 363/84; 363/86
(58) Field of Classification Search
USPC .............................. 363/52, 53, 81, 82, 84, 86
See application file for complete search history.

(56) References Cited

U.S. PATENT DOCUMENTS

| | | | |
|---|---|---|---|
| 7,974,113 B2 * | 7/2011 | Shimada et al. | 363/98 |
| 8,045,309 B2 * | 10/2011 | Shimada | 361/93.1 |
| 8,097,981 B2 * | 1/2012 | Shimada et al. | 307/66 |
| 2007/0159279 A1 * | 7/2007 | Shimada et al. | 335/40 |
| 2010/0014333 A1 * | 1/2010 | Shimada et al. | 363/126 |
| 2010/0090533 A1 * | 4/2010 | Shimada et al. | 307/66 |
| 2011/0032652 A1 * | 2/2011 | Shimada | 361/91.2 |
| 2011/0109239 A1 * | 5/2011 | Kojima | 315/250 |
| 2011/0115417 A1 * | 5/2011 | Shimada | 318/139 |

FOREIGN PATENT DOCUMENTS

| | | |
|---|---|---|
| JP | H11-355909 A | 12/1999 |
| JP | 3634982 B | 1/2005 |
| JP | 2007-049828 A | 2/2007 |
| JP | 2007-535282 A | 11/2007 |
| JP | 2007-097341 A | 12/2007 |
| JP | 2008-204810 A | 4/2008 |
| JP | 2008-206300 A | 4/2008 |
| JP | 2008-193817 A | 8/2008 |
| WO | 2005/067117 A1 | 7/2005 |
| WO | 2007/122701 A1 | 11/2007 |
| WO | 2008/096664 A1 | 8/2008 |

* cited by examiner

*Primary Examiner* — Bao Q Vu
(74) *Attorney, Agent, or Firm* — International Knowledge Asset Office; Keiji Masaki

(57) ABSTRACT

A power converter stabilizes a voltage by controlling leading of an AC current and performs maximum charging within contracted power reception amount when connected to a weak power system. The power converter comprises Magnetic Energy Recovery Switch comprising a bridge circuit including at least two reverse conductive type semiconductor switches and a magnetic energy accumulating capacitor with a small capacity connected between DC terminals of the bridge circuit. The power converter uses the Magnetic Energy Recovery Switch to perform power conversion from AC to DC or vise versa. Plurality of secondary battery charging devices each comprising the power converter have a DC part connected to a common DC bus bar, so that power is accommodated among the secondary battery charging devices.

18 Claims, 7 Drawing Sheets

US 8,482,945 B2

POWER CONVERTER WITH MAGNETIC RECOVERY SWITCH

TECHNICAL FIELD

The present invention relates to a power converter which can perform reverse conversion from AC power or DC power to DC power and more particularly, a power converter which is used for a charging/discharging device that charges/discharges a secondary battery (battery) of electric vehicles.

BACKGROUND ART

Conventionally, simple transformer which steps down a single-phase 100 V in Japan and a diode rectifier are used in order to charge a secondary battery like a vehicular battery. For large-capacity charging, various schemes for power conversion from AC power to DC power are made in practical use. High power factor and high efficiency are desired for such power conversion schemes, and reduction of the number of component parts and simplification of controlling are also desired.

Charging can be performed by a PFC circuit which is the latest power conversion technology with a PWM converter and a flyback circuit using semiconductor switches that can be switched off, such as a power MOSFET and an IGBT (see patent literatures 1, 2, 3, and 4). Moreover, various systems are also proposed, such as a system of efficiently charging plural vehicles in consideration of cost-effectiveness (see patent literature 2), a system of performing rapid charging efficiently regardless of a change in an environment (see patent literature 3), and a system of performing charging from a three-phase AC source (see patent literature 4). However, all of those systems perform hard switching for power conversion, thus having a large switching loss. Moreover, controlling of charging power regardless of the voltage value of a system voltage and the frequency thereof rises a problem from the standpoint of the system stability.

High-speed semiconductor switches are desirable for power conversion, but as a circuit technology, a soft switching technology which zeroes either one of or both of a voltage and a current at on/off time is preferable from the standpoint of not only the conversion efficiency but also its capability of reducing any generation of noises, so that such a technology is an important solution.

There is proposed a switch (hereinafter, Magnetic Energy Recovery Switch (MERS)) which can perform on/off control on currents in both forward and backward directions through gate controlling only using four reverse conductive type semiconductor devices (hereinafter, reverse conductive type semiconductor switches) having no reverse blocking capability, stores magnetic energy possessed by a current in a capacitor when the current is cutoff, and performs discharging to a load side through a semiconductor device where a on-gate signal is applied to regenerate a current, thereby accomplishing the bidirectionality of currents and regenerating magnetic energy possessed by a circuit without any loss (see patent literature 5). Moreover, there is proposed an AC/DC power converter which performs switching in synchronization with an AC power source using such Magnetic Energy Recovery Switch (MERS) (see patent literature 6).

Furthermore, there is proposed a device for performing stable power-flow control regarding power reception from a system (see patent literature 7).

Patent Literature 1: Unexamined Japanese Patent Application KOKAI Publication No. 2008

Patent Literature 2: National Patent Application Publication No. 2007-535282
Patent Literature 3: Unexamined Japanese Patent Application KOKAI Publication No. 2007-049828
Patent Literature 4: Unexamined Japanese Patent Application KOKAI Publication No. 2007-097341
Patent Literature 5: Japanese Patent No. 3634982
Patent Literature 6: International Publication No. WO2008/096664
Patent Literature 7: International Publication No. WO2005/067117

DISCLOSURE OF INVENTION

Problem to be Solved by the Invention

Regarding charging devices with a large capacity, ones which are highly-efficient and not harmful to a system are desired. For example, when electric vehicles become popular and the number thereof increases, usage of night power may advance, and it is preferable because the utilization of power equipment at night may increase.

However, when such utilization is carried out at the garage of individual residence, power from 1 kW to 2 kW is successively consumed. In accordance with popularization of electric vehicles, night power is consumed for charging of several million electric vehicles, and as charging devices controlled with semiconductor devices serve as electric power loads with constant power, it is not desirable because the stability of the system is further reduced.

It is an object of the present invention to provide an power converter using Magnetic Energy Recovery Switch (MERS) which can cause switching operations of all switching devices to be soft switching operations, reduces high-frequency noises, permits reversible power directions, and can boost a voltage, and, in particular, a power converter which can be used as a charging/discharging device for a secondary battery (battery) of electric vehicles.

It is another object of the present invention to provide a power converter which, by being used as a DC/DC power converter wherein Magnetic Energy Recovery Switch (MERS) is disposed between a direct-current bus bar and a secondary battery (battery), controls charging of individual secondary batteries (batteries) generates a phase-leading current to control a voltage at a power receiving point in consideration of a power receiving contract like a capacity of power reception, has a function of reversely feeding AC power from a secondary battery (battery) as needed, and is not harmful to a system.

Means for Solving the Problem

In order to achieve the above objects, the power converter according to an exemplary aspect of the present invention comprises Magnetic Energy Recovery Switch comprising a bridge circuit including four reverse conductive type semiconductor switches and a magnetic energy accumulating capacitor C which accumulates magnetic energy possessed by a current at the time of current cutoff and which is connected between DC terminals DC(P), DC(N) of the bridge circuit, and wherein the power converter employs a circuit configuration in which an AC power source is connected between AC terminals AC, AC of the bridge circuit through a inductor Lac, and a DC power source or a load is connected between the DC terminals DC(P), DC(N) through a smoothing inductor Ldc, and wherein
the power converter further comprises:
a gate control device which performs on/off control on the reverse conductive type semiconductor switches by supplying a control signal to a gate of each reverse conductive type semiconductor switch, the gate control device performing controlling in such a way that a pair of the reverse conductive type semiconductor switches on a diagonal line of the bridge is turned on, while at the same time, another pair of the reverse conductive type semiconductor switches is turned off, the gate control device also allowing a pair of the reverse conductive type semiconductor switches selected by a direction of a current from the AC power source to perform high speed on/off operation;

means for generating a boosted pulse voltage between the DC terminals DC(P), DC(N); and means for allowing the boosted pulse voltage to flow in the DC power source, a secondary battery (battery) or the AC load through the smoothing inductor Ldc in order to smooth and convert the boosted pulse voltage to a DC voltage, and wherein the power converter is connected to a secondary battery (battery) charging device in series or in parallel, or a series connection and a parallel connection is interchanged by an opening/closing switch, the secondary battery charging device controls charging conditions, such as a temperature of the secondary battery (battery) and a charging amount of the secondary battery, in a long term, shifts a power factor of an input current from a lagging power factor to a leading power factor in a short term, and adjusts a current power factor together with a lagging power factor of another power system to reduce the current, thereby reducing Joule loss and compensating voltage variation, overvoltage, and undervoltage at a power receiving point.

The above power converter may have a configuration in which the Magnetic Energy Recovery Switch comprises a bridge circuit including two reverse conductive type semiconductor switches and two diodes opposite to the reverse conductive type semiconductor switches, and two magnetic energy accumulating capacitors each of which is connected to each of the two diodes in parallel, the magnetic energy accumulating capacitors being connected together in series.

The above power converter may have a configuration in which the Magnetic Energy Recovery Switch comprises two reverse conductive type semiconductor switches connected in an anti-series connection manner, two magnetic energy accumulating capacitors connected together in series, the two reverse conductive type semiconductor switches and the two magnetic energy accumulating capacitors being connected in parallel, and a wiring interconnecting a middle point between the two reverse conductive type semiconductor switches and a middle point between the two magnetic energy accumulating capacitors.

The above power converter may be characterized in that an on/off cycle of the Magnetic Energy Recovery Switch is set to be longer than a discharging time set based on a capacitance (C) of the magnetic energy accumulating capacitor C of the Magnetic Energy Recovery Switch and an inductance (Lac) of the inductor Lac thereof, a voltage of the Magnetic Energy Recovery Switch becomes zero by discharging for each cycle, zero voltage is accomplished when the reverse conductive type semiconductor switch turns off and zero current is accomplished when the reverse conductive type semiconductor switch turns on.

The above power converter may have a configuration in which when the means for generating the boosting pulse voltage is a three-phase AC power source, the Magnetic Energy Recovery Switch employs a three-phase full wave bridge configuration by six reverse conductive type semiconductor switches with three arms of the bridge which are one in the case of single-phase AC, the magnetic energy accumulating capacitor C is connected between terminals P, N of a DC bus bar, the two reverse conductive type semiconductor switches in each arm in a current direction of three-phase AC are selected and all selected reverse conductive type semiconductor switches are simultaneously turned on/off at a high speed, and the boosting pulse voltage is generated between the terminals P, N of the DC bus bar, thereby performing conversion of three-phase AC power.

The above power converter may have a configuration in which when the input power source is a DC voltage, only a pair of the reverse conductive type semiconductor switches on a diagonal line of the Magnetic Energy Recovery Switch is turned on/off at a high speed, but another pair of the reverse conductive type semiconductor switches is always maintained in off state to function as a diode for reverse conduction, a direction of the current is reversed, thereby inverting power from the secondary battery (battery) to AC.

The above power converter may further comprise a control device wherein a magnitude and a direction of an input voltage of the Magnetic Energy Recovery Switch, a magnitude and a direction of an input current of the Magnetic Energy Recovery Switch, a voltage and a current of a DC output or an AC output, and a voltage of the magnetic energy accumulating capacitor are input, and the control device, in consideration of an on/off time ratio of a gate pulse signal to be applied to the reverse conductive type semiconductor switch, and a switch cycle thereof, protects the reverse conductive type semiconductor switch and performs on/off control thereof.

The above power converter may have a configuration in which when power inversion is unnecessary, the power converter comprises a diode instead of the smoothing inductor Ldc for pulse pulsation, prevents a reverse current to an output capacitor, and performs zero-voltage/zero-current switching in which the reverse conductive type semiconductor switch is turned off at zero voltage and the reverse conductive type semiconductor switch is turned on at zero current.

The power converter according to another exemplary aspect of the present invention comprises Magnetic Energy Recovery Switch, the Magnetic Energy Recovery Switch including:

a bridge circuit comprising four reverse conductive type semiconductor switches;

a magnetic energy accumulating capacitor C connected between DC terminals of the bridge circuit, and accumulating magnetic energy possessed by a current at the time of current cutoff; and a gate control device which applies a control signal to a gate of each reverse conductive type semiconductor switch, and which performs controlling in such a way that a pair of the reverse conductive type semiconductor switches on a diagonal line of the bridge circuit is turned on, while at the same time, another pair of the reverse conductive type semiconductor switches is turned off, and wherein:

an AC terminal of the bridge circuit is connected to an AC or DC input power source through a inductor Lac;

a DC terminal of the bridge circuit is connected to a DC output power source through a smoothing inductor Ldc;

the gate control device causes a pair of the reverse conductive type semiconductor switches selected based on a direction of a current from the input power source to perform on/off operation at a high speed, and causes another pair of the reverse conductive type semiconductor switches to turn off, thereby generating a boosted pulse voltage between DC terminals of the bridge circuit;

the smoothing inductor Ldc smooths the boosted pulse voltage to convert the boosted pulse voltage into a DC voltage; and the high speed on/off operation synchronizes a high speed on/off control frequency lower than a resonance frequency of the bridge circuit set based on a capacity of the magnetic energy accumulating capacitor C and an inductance (Lac) of the inductor Lac, and a flow of a power between the input power source and the DC output power source is controlled by changing the high speed on/off control frequency and/or an on/off time ratio.

The above power converter may have a configuration in which when the input power is an AC voltage, the pair of reverse conductive type semiconductor switches selected according to the current direction of the input power source and performing the high speed on/off operation is alternated in sync with the frequency of the AC voltage each time the current direction is altered.

The above power converter may have a configuration in which when the input voltage is a DC voltage, only one of the pairs of reverse conductive type semiconductor switches is selected according to the current direction of the input power source and performs the high speed on/off operation and the other pair is normally turned off.

The power converter according to a further other exemplary aspect of the present invention is a power converter comprising:

first Magnetic Energy Recovery Switch including a first bridge circuit consisting of four first reverse conductive type semiconductor switches, a first magnetic energy accumulating capacitor C connected between the DC terminals DC (P), DC (N) of the bridge circuit for accumulating the magnetic energy held by the current at the time of current cutoff, and a first gate control device supplying control signals to the gates of the first reverse conductive type semiconductor switches for turning on/off the first reverse conductive type semiconductor switches; and second Magnetic Energy Recovery Switch including a second bridge circuit consisting of four second reverse conductive type semiconductor switches, a second magnetic energy accumulating capacitor C connected between the DC terminals DC (P), DC (N) of the bridge circuit for accumulating the magnetic energy held by the current at the time of current cutoff, and a second gate control device supplying control signals to the gates of the second reverse conductive type semiconductor switches for turning on/off the second reverse conductive type semiconductor switches, wherein the AC terminals AC, AC of the first bridge circuit can be connected to an AC power source via a first inductor Lac, the DC terminals DC (P), DC (N) of the first bridge circuit are connected to a DC bus bar via a first smoothing inductor Ldc, either the AC terminals AC, AC of the second bridge circuit or the DC terminals DC (P), DC (N) of the second bridge circuit are connected to the DC bus bar via a second inductor Lac or via a second smoothing inductor Ldc, and the other terminals can be connected to a secondary battery, the first and second gate control devices allow one of the pairs of reverse conductive type semiconductor switches that is selected according to the current direction of the input power source to perform high speed on/off operation and turn off the other pair of reverse conductive type semiconductor switches so as to generate a boosted pulse voltage at the DC terminals of the corresponding one of the bridge circuits, the smoothing inductor Ldc smoothes and converts the boosted pulse voltage to a DC voltage, in the high speed on/off operation of the first Magnetic Energy Recovery Switch, the pairs of reverse conductive type semiconductor switches, which are selected according to the current direction of the input power source and perform the high speed on/off operation in sync with a first high speed on/off control frequency lower than the resonant frequency of the first bridge circuit and determined by the capacitance (C) of the first magnetic energy accumulating capacitor C and the inductance (Lac) of the first inductor Lac, are alternated in sync with the frequency of the AC voltage, and the first high speed on/off control frequency and/or the on/off time ratio is changed to control the power flow between the AC power source and DC bus bar, and in the high speed on/off operation of the second energy recovery switch, only one of the pairs of reverse conductive type semiconductor switches is selected according to the current direction of the input power source and performs the high speed on/off operation in sync with a second high speed on/off control frequency lower than the resonant frequency of the second bridge circuit and determined by the capacitance (C) of the second magnetic energy accumulating capacitor C and the inductance (Lac) of the second inductor Lac, and the other pair is normally turned off, and the second high speed on/off control frequency and/or the on/off time ratio is changed to control the power flow between the DC bus bar and secondary battery.

The above power converter may have a configuration in which a plurality of the second Magnetic Energy Recovery Switch is connected to the DC bus bar and a plurality of secondary batteries can be connected via each of the second Magnetic Energy Recovery Switch.

The above power converter may have a configuration including both the second Magnetic Energy Recovery Switch in which the AC terminals AC, AC of the second bridge circuit are connected to the DC bus bar via the second inductor Lac and the second Magnetic Energy Recovery Switch in which the DC terminals DC (P), DC (N) of the second bridge circuit are connected to the DC bus bar via the second smoothing inductor Ldc.

The above power converter may have a configuration in which the high speed on/off control frequency is increased and/or the on time ratio in the on/off control is increased for conversion from the input power source connected to the AC terminals AC, AC of the bridge circuit, first bridge circuit, and/or second bridge circuit to the output power source connected to the DC terminals DC (P), DC (N) of the bridge circuit, first bridge circuit, and/or second bridge circuit.

The above power converter may have a configuration in which at a charging station capable of simultaneously charging a number of secondary batteries, a central control device administrating and controlling the charged amounts of individual secondary batteries is provided, inversion from a number of charging secondary batteries is conducted, the inverted electric power is collected to charge a specific secondary battery in need of quick charging, thereby lowering the peak value of power received from an external source.

The above power converter may have a configuration in which when the charging device charging secondary batteries includes a significantly fluctuating power generator such as a solar power generator and wind power generator in its system, the battery charging device utilizes the power/voltage fluctuation as a variable absorption element.

The above power converter may have a primary configuration factor for which the Magnetic Energy Recovery Switch is provided at a connection point to a power system for preventing reverse power flows, whereby when the system undergoes an abnormal event such as temporal system voltage drop, high impedance due to a reversed phase current causes automatic cutoff for stabilizing the region's power/voltage.

The present invention allows power storage devices to be scattered and is useful for stabilizing the power system and voltage and preventing power outage. In case of charging the secondary battery of an electric vehicle, a number of electric vehicles are connected to a power system via a charging device and using the secondary battery as an emergency power source is socially important for safe and secure energy in Japan, where natural disasters such as earthquakes and typhoon often occur.

On the other hand, using 1 kW electric power at night on a charging device is costly for a household with a low vehicle usage. The charging device can easily be operated without increasing the contracted user power charge and basic rate. The current at a power reception point is detected and the charging device is controlled with feedback; then, the charging up to the maximum capacity within the power user contract is conducted. Even if the charging current irregularly intermits, there is no problem with the secondary battery because it is charged by the current in a cumulative manner.

The inversion by an AC-DC power converter using an MERS also plays a role of SVC (static var compensator) generating a leading current. Therefore, in need of quick charging, the inversion can be used to obtain several tens kW electric power in a short time while compensating the voltage.

For obtaining several tens kW electric power from a power system, a small capacitance transformer undergoes voltage drop due to high impedance. However, the voltage drop can be compensated using the reactance voltage raised by a current with a leading power factor. When many electric vehicles are charged at a charging station, the electric vehicles charged and still connected may be utilized. It is like lending electric power to a vehicle in need of quick charging. Consequently, the power user contract can be reduced.

For large electric power, for example, the power quantity is controlled by 30 minutes demand. The charging device should be linked to the control system. Consequently, some control can be available; for example, the electric power at the disposal of the controller is used to fill between 39 minutes demands.

DESCRIPTION OF REFERENCE NUMERALS

Figure 1:
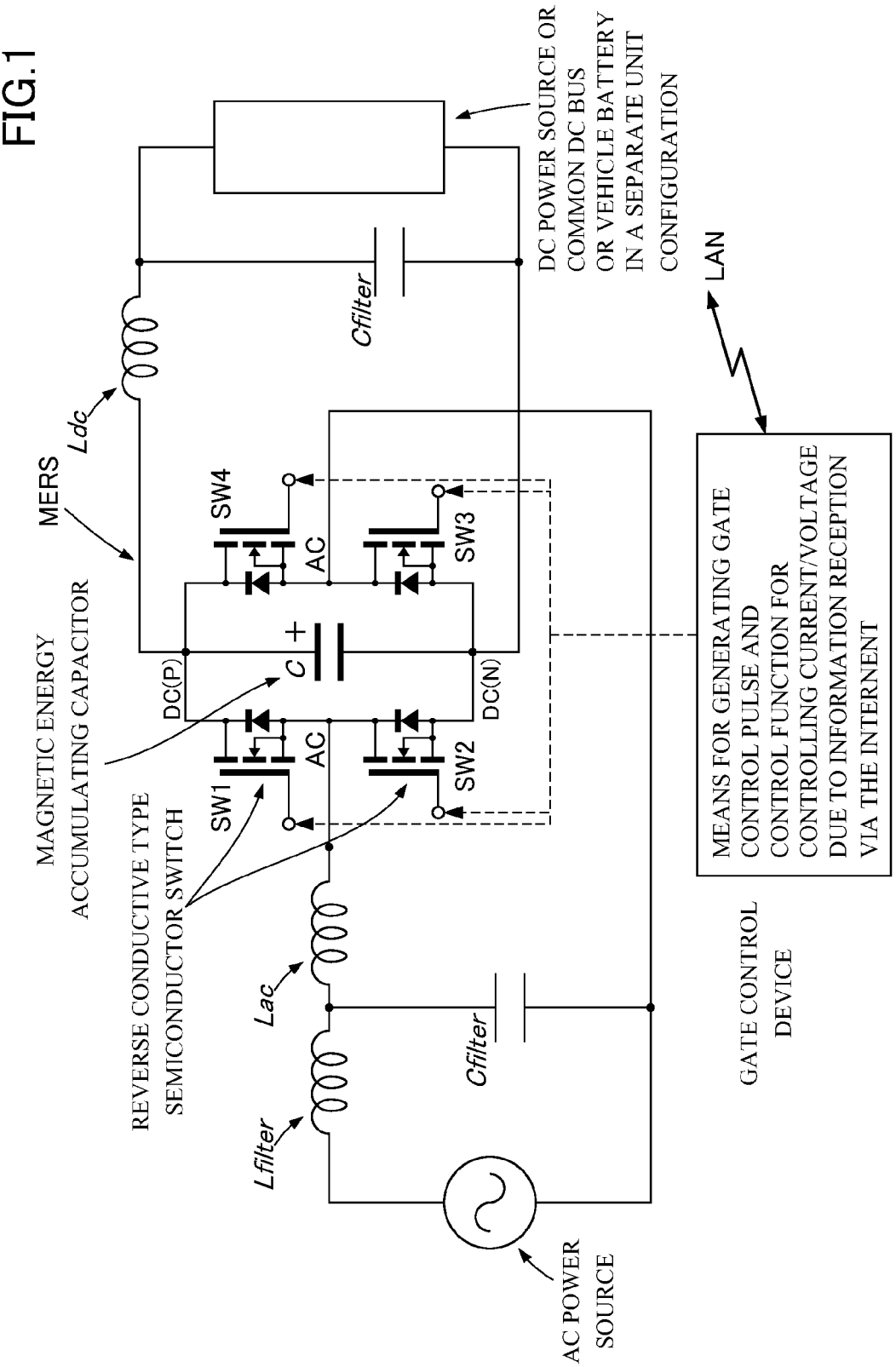
FIG. 1 is a circuit block diagram showing a schematic configuration of a power converter according to an embodiment of the present invention.

SW1, SW2, SW3, and SW4: Reverse conductive type semiconductor switch
Lac: Inductor
(Lac): Inductance (value) of inductor Lac
Ldc: Smoothing inductor
(Ldc): Inductance (value) of smoothing inductor Ldc
C: Magnetic energy accumulating capacitor
(C): Capacitance of magnetic energy accumulating capacitor
Lfilter: Inductor for filter
Cfilter: Capacitor for filter
AC, AC: AC terminal of Magnetic Energy Recovery Switch (MERS)
DC(P), DC(N): DC terminal (magnetic energy accumulating capacitor connection side) of Magnetic Energy Recovery Switch (MERS)
P, N: Terminal of DC bus bar
Vin: Input voltage (commercial power source 100 V, 50 Hz)
UY: On-gate signal for reverse conductive type semiconductor switch SW1, SW3
VX: On-gate signal for reverse conductive type semiconductor switch SW2, SW4
Ifilter: Current flowing through filter capacitor Lfilter
Imers: Current flowing through magnetic energy accumulating capacitor C
Vmers: Voltage (boosting pulse voltage between DC terminals DC(P) and DC(N)) of magnetic energy accumulating capacitor C
Vout: Voltage (DC load voltage) applied across resistance load Rload Iout: Current flowing through resistance load Rload
Rload: Resistance load
V: Voltage meter
A: Ammeter
MERS1, MERS2, MERS3, and MERS4: full-bridge type Magnetic Energy Recovery Switch (MERS)
Source A: AC power source, DC power source, resistance load, and capacitor
Source B: DC power source, resistance load, and capacitor

BEST MODE FOR CARRYING OUT THE INVENTION

An explanation will be given of an embodiment of the present invention with reference to the accompanying drawings. The same structural elements, members, and processes will be denoted by the same reference numerals in the drawings, and duplicated explanation will be omitted. The embodiment of the present invention is not for limiting the scope of the present invention, but for exemplifying the present invention, and it is not necessary that all characteristics and the combination thereof explained in the embodiment are always requisite to embody the present invention.

FIG. 1 is a circuit block diagram showing a schematic configuration of an electric-vehicle charging device mainly comprising a power converter using Magnetic Energy Recovery Switch (MERS) according to the embodiment of the present invention. The power converter of the present invention mainly comprises an MERS (Magnetic Energy Recovery Switch) disclosed in foregoing patent literature 5.

The Magnetic Energy Recovery Switch (MERS) includes a bridge circuit comprising four reverse conductive type semiconductor switches, a magnetic energy accumulating capacitor C connected between a direct-current terminal DC(P) of the bridge circuit and a direct-current terminal DC(N) thereof and accumulating magnetic energy possessed by a current when the current is cutoff, and a gate control device which supplies a control signal to the gate of each reverse conductive type semiconductor switch, simultaneously turns on a pair of reverse conductive type semiconductor switches located on a diagonal line of the bridge circuit and turns off the other pair of reverse conductive type semiconductor switches, and the MERS regenerates a current as the magnetic energy accumulating capacitor performs discharging toward a load side through a reverse conductive type semiconductor switch to which an on-gate signal is applied. The MERS is a switch accepting bidirectionality of currents and performing regeneration without losing any magnetic energy possessed by the circuit. An AC or DC input power source can be connected between alternate-current terminals AC and AC of the bridge circuit through a inductor Lac. The direct-current terminals DC(P) and DC(N) of the bridge circuit are connected to terminals P, N of a direct-current bus bar, respectively, through a smoothing inductor Ldc.

The gate control device turns on/off a pair of reverse conductive type semiconductor switches selected based on the direction of a current from the input power source at a high speed and maintains the other pair of the reverse conductive type semiconductor switches in off state to generate a boosting pulse voltage pulsating at the high speed on/off operation frequency across the DC terminals of the bridge circuit. The boosting pulse voltage is subjected to smoothing by the smoothing inductor Ldc having a sufficient inductance with reference to a pulse frequency, and is converted into a DC voltage. When input power is an AC voltage, individual pairs of reverse conductive type semiconductor switches selected based on the direction of a current from the input power source and turned on/off at a high speed are changed alternately in synchronization with the frequency of the AC voltage every time the direction of the current changes. That is, in the case of AC, every time the direction of the current changes in synchronization with an AC frequency, a pair turned on/off at a high speed and the other pair maintained in off state are changed alternately. For example, at AC 50 Hz, when the direction of the current is positive, a pair of SW2, SW4 is turned on/off at a high speed, and the other pair of SW1, SW3 is maintained in off state, but when the direction is negative, the pair of SW1, SW3 is turned on/off at a high speed, and the other pair of SW2, SW4 is maintained in off state.

While, for example, the reverse conductive type semiconductor switches SW2, SW4 turn on at a half cycle when a power-source voltage is positive by the high speed on/off operation, the reverse conductive type semiconductor switches SW1, SW3 are maintained in off state and function as diodes, conduction is permitted between the terminals AC and AC of the bridge circuit, a current increases, and magnetic energy is accumulated in the inductor Lac. When the reverse conductive type semiconductor switches SW2, SW4 are turned off, magnetic energy accumulated in the inductor Lac flows in, as a current, the magnetic energy accumulating capacitor C and the load. At this time, the current flows in such that a voltage applied to the load and a voltage applied to the magnetic energy accumulating capacitor C become equal to each other. The magnetic energy is boosted to compensate power supplied from the power source, and a voltage across both terminals of the magnetic energy accumulating capacitor C increases. The level of boosting varies depending on the impedance of the load, and the impedance of the magnetic energy accumulating capacitor C. Moreover, it also varies depending on the high speed on/off control frequency, and the like.

The high speed on/off operation is performed at a high speed on/off control frequency which is lower than a resonance frequency set based on the capacitance (C) of the magnetic energy accumulating capacitor C and the inductance (Lac) of the inductor Lac. Accordingly, there is a period that every time the voltage of the magnetic energy accumulating capacitor C becomes zero after discharging, so that each reverse conductive type semiconductor switch can be turned off by zero voltage, and when such switch is turned on, because of the presence of the inductor, a current does not rise rapidly, so that such switch can be turned on by zero current, resulting in accomplishment of zero-current/zero-voltage switching.

The higher the high speed on/off control frequency is and/or the higher the on duty ratio of an on/off time ratio (duty ratio) is, the higher the boosting pulse voltage between the DC terminals DC(P), DC(N) becomes, and as the high speed on/off control frequency and/or the on/off time ratio (duty ratio) is successively changed, the boosting pulse voltage between the DC terminals DC(P), DC(N) can be successively changed, thereby successively changing a voltage of an input voltage side with reference to the DC bus bar side. When the voltage of the input voltage side with reference to the DC bus bar side is higher than the voltage of the DC bus bar, power flows to the DC bus bar side from the input voltage side, and conversion from AC to DC is performed. Conversely, when it is lower than the voltage of the DC bus bar, power flows to the input voltage side from the DC bus bar side, and inversion is performed from DC to AC. Accordingly, because of successive changing at a range across the high speed on/off control frequency that both voltages are balanced and/or the on/off time ratio (duty ratio), the flow of power between the input power source and the DC bus bar can be successively changed to, for example, large-current conversion, small-current conversion, zero (no power conversion), small-current inversion, and large-current inversion.

Figure 2:
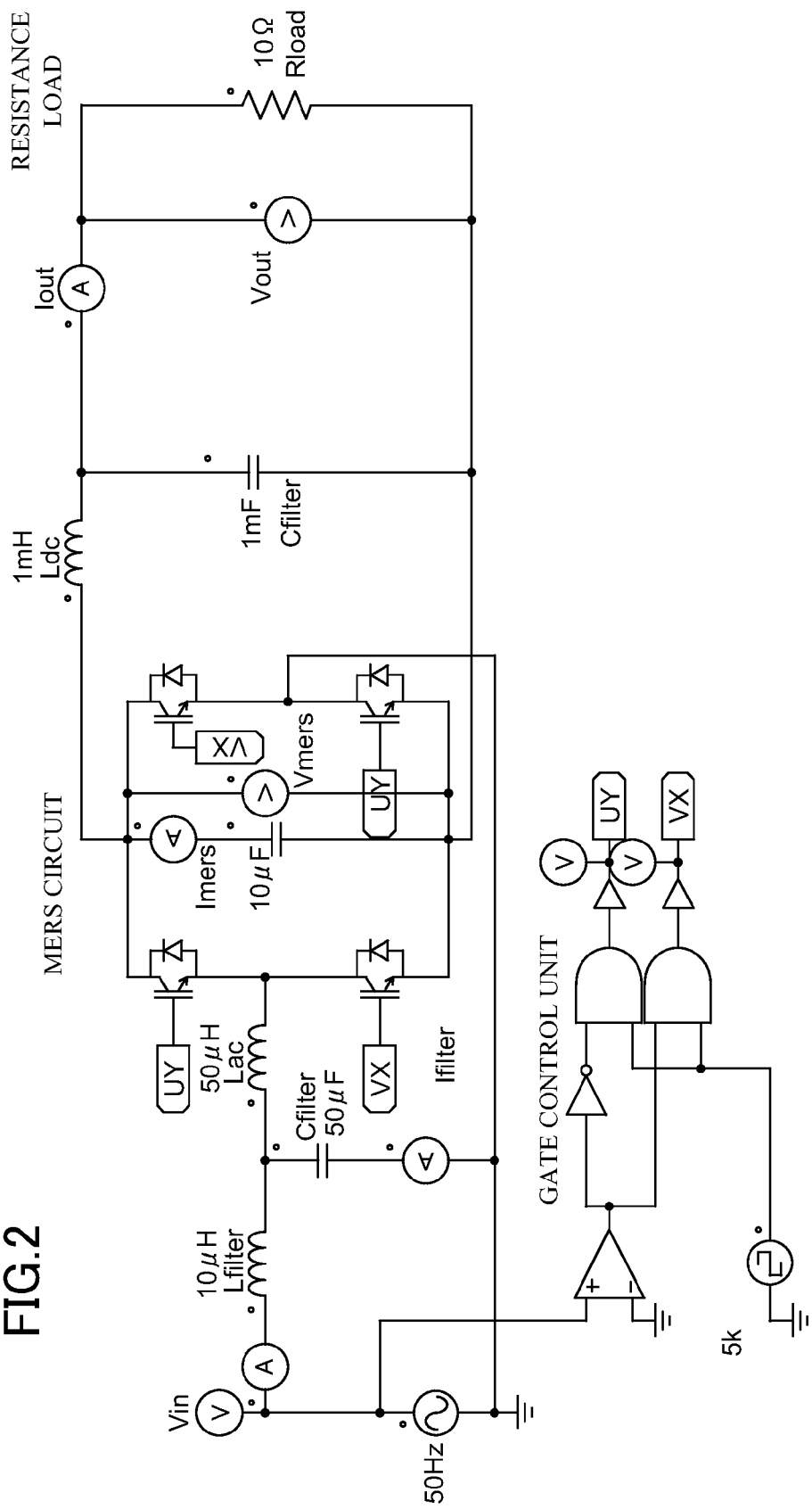
FIG. 2 is a circuit diagram showing a simulation circuit of the power converter according to the embodiment of the present invention.

FIG. 2 shows a simulation circuit. An AC power source is a 100 V and 50 Hz power source commercially available in Japan, and is connected to the bridge circuit through a filter capacitor Lfilter of 10 µH and the AC inductor (Lac) of 50 µH. The capacitance (C) of the magnetic energy accumulating capacitor C is 10 µF. This circuit has a resonance frequency of approximately 7 KHz set based on 50 µH inductance of the inductor Lac and 10 µF capacitance of the magnetic energy accumulating capacitor C. A resistance load Rload corresponding to the DC bus bar is 10Ω. A current Iout flowing through the resistance load Rload and a voltage (DC load voltage) Vout applied to the resistance load Rload can be measured by an ammeter and a voltage meter, respectively.

Figure 3:
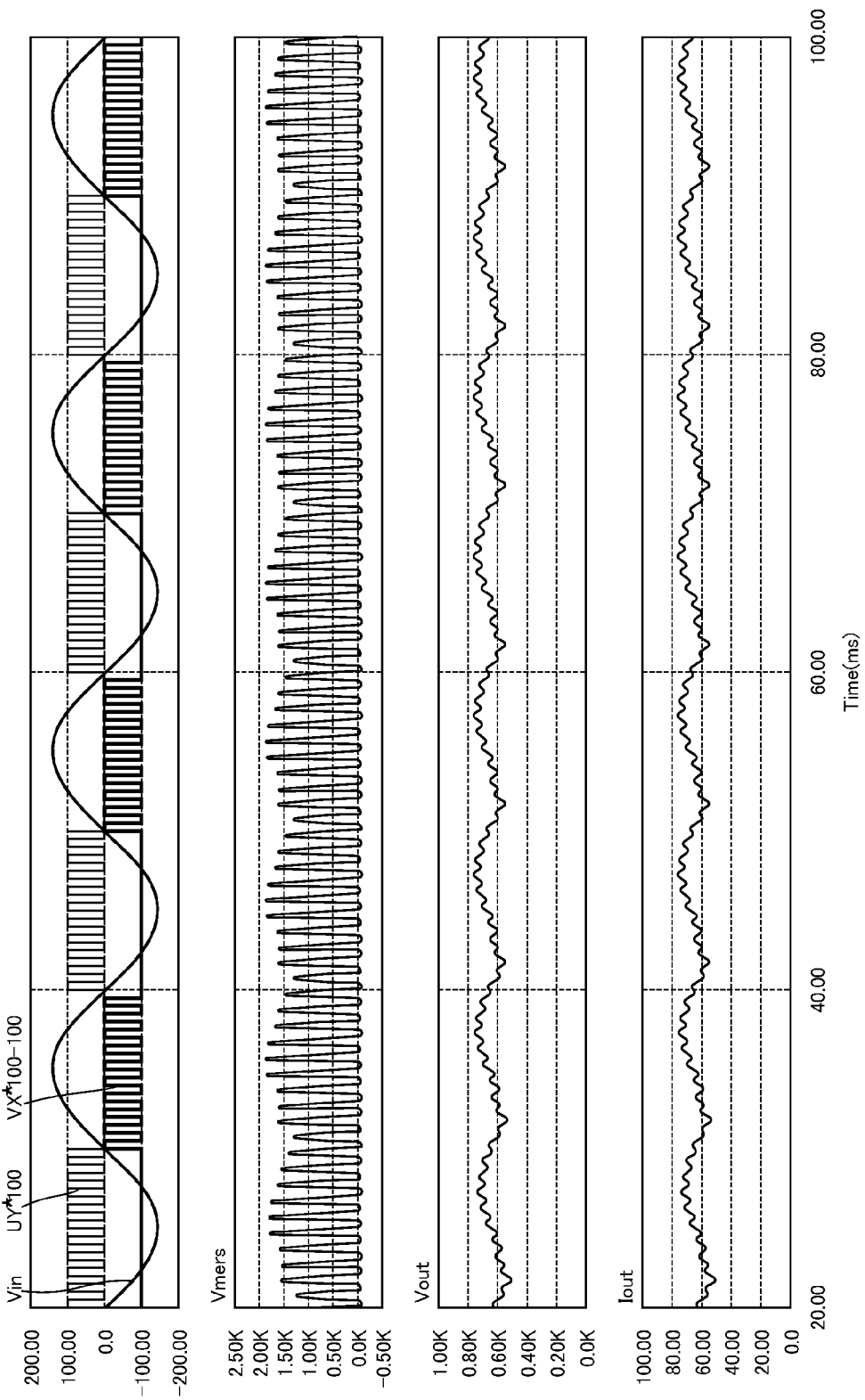
FIG. 3 is a graph showing a simulation result.

FIG. 3 is a graph showing a simulation result using the simulation circuit of FIG. 2. The uppermost graph shows, as an input voltage, a high speed on/off control signal together with a 100 V and 50 Hz power source commercially available in Japan. The frequency of the high speed on/off control signal is 1 KHz, and the on/off time ratio (duty ratio) has an on part of 0.7. A reverse conductive type semiconductor switch to be controlled is changed as the polarity of the AC voltage changes, and each reverse conductive type semiconductor switch is subjected to switching at 1 KHz. The second graph from above shows the boosting pulse voltage between the DC terminals DC(P), DC(N), and the peak value thereof is boosted to 1500 V or so. The third graph from the above shows a voltage (DC load voltage) Vout applied to the resistance load Rload (10Ω) and the lowermost graph shows a current Iout flowing through the resistance load. The DC load voltage Vout is boosted to 680 V at average. The load voltage can be successively lowered and set to be a desired value by reducing the frequency of the high speed on/off operation and/or the on/off time ratio (duty ratio of on part).

Accordingly, the electric-vehicle charging device comprising the power converter using the Magnetic Energy Recovery Switch (MERS) can charge a secondary battery (battery) of DC 200V or DC 400 V using the 100 V power source commercially available in Japan as an input power source. Moreover, the charging device of the present invention performs soft switching with zero current and zero voltage for both conversion and inversion, has little power conversion loss, and basically, no high-frequency noises inherent to switching is generated.

Figure 4:
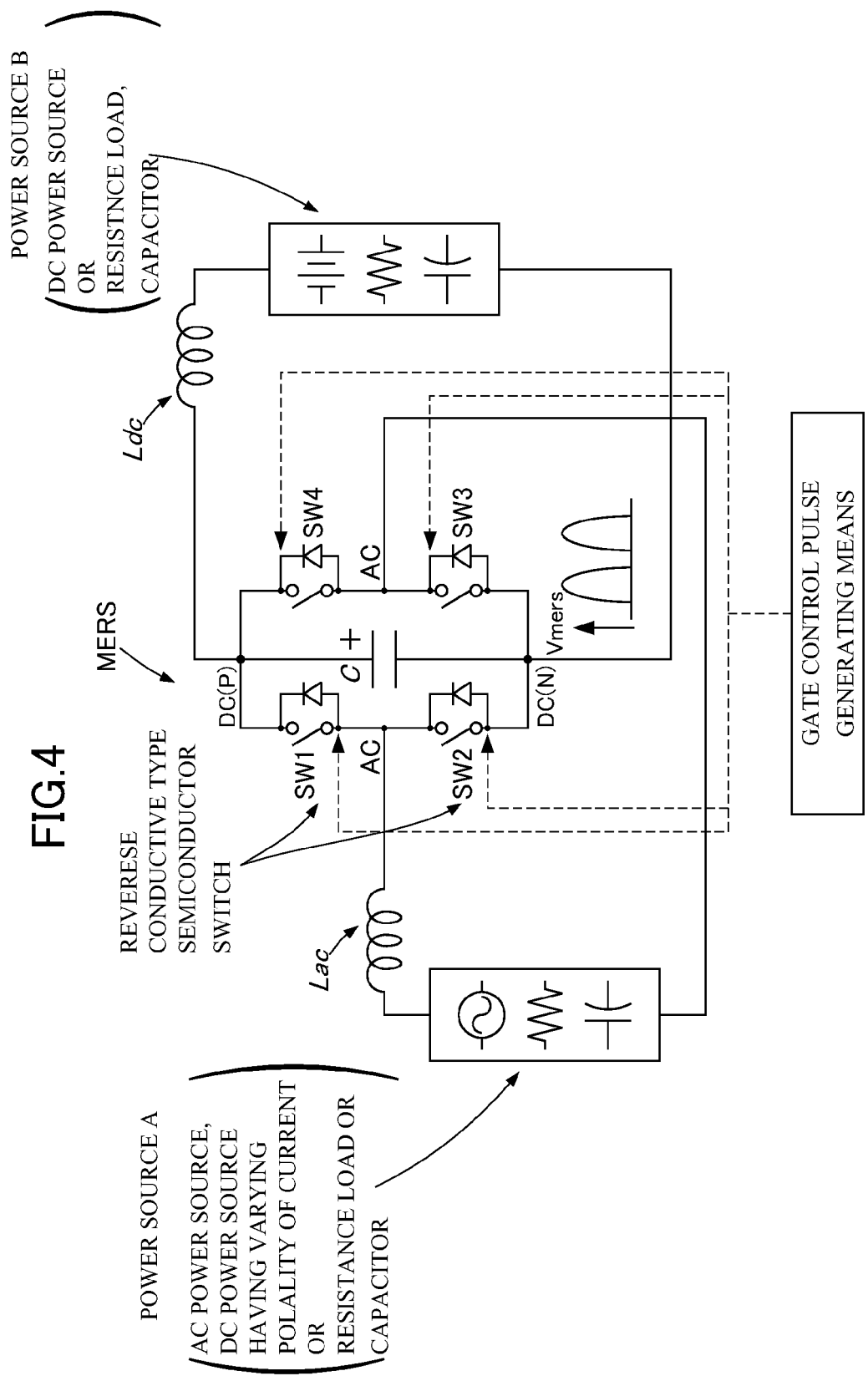
FIG. 4 is a basic circuit diagram showing a circuit which converts an alternate current or a direct current into a direct current using Magnetic Energy Recovery Switch.

FIG. 4 shows a basic configuration of a bidirectional power converter using the Magnetic Energy Recovery Switch (MERS). Source A is an input power source, and can be an AC power source or a DC power source. Source B is a DC power source or a DC bus bar. The power converter performs conversion from the Source A to the Source B (from AC or DC to DC) and inversion from the Source B to the Source A (from DC to AC or DC) by controlling the gate signals to the respective reverse conductive type semiconductor switches.

The conversion/inversion when the source A is AC power and the source B is DC power (or DC bus bar) is performed as explained with reference to FIGS. 1 to 3. Next, when the source A is DC power and the source B is DC power (DC bus bar), the direction of a current synchronizes the frequency and alternately repeats in the case of AC, while the direction of the current is constant in the case of DC, so that a pair of reverse conductive type semiconductor switches selected based on the direction of the current from the input power source is subjected to a high speed on/off operation, and the other pair thereof is always maintained in off state. That is, in the case of AC, every time the direction of the current changes in synchronization with the frequency of the AC voltage, a pair subjected to a high speed on/off operation and the other pair to be maintained in off state are alternately changed, but in the case of DC, a pair subjected to a high speed on/off operation and the other pair to be maintained in off state are not interchanged while the direction of the current remains same. For example, when the direction of the current is a forward direction from the source A to the source B, a pair of only SW2, SW4 is subjected to a high speed on/off operation, while a pair of SW1, SW3 is always maintained in off state, and only a diode for reverse conduction operates.

As shown in FIG. 4, the input power source (DC power) is connected to the AC terminals AC, AC of the bridge circuit of the Magnetic Energy Recovery Switch (MERS) through the inductor Lac. A specific example of the input power source (DC power) is a secondary battery (battery) for electric vehicles. The DC terminals DC(P), DC(N) of the bridge circuit are connected to the terminals P, N of the DC bus bar, respectively, through a smoothing inductor Ldc. Likewise, the boosting pulse voltage pulsating at the high speed on/off operation frequency is generated across the DC terminals DC(P), DC(N) of the bridge circuit by the high speed on/off operation, is subjected to smoothing by the smoothing inductor Ldc having a sufficient inductance with reference to a pulse frequency, and is converted into a DC voltage.

When the input power source is DC power, the high speed on/off operation is performed at a high speed on/off control frequency lower than the resonance frequency set based on the capacitance (C) of the magnetic energy accumulating capacitor C and the inductance (Lac) of the inductor Lac. Accordingly, there is a period that every time the voltage of the magnetic energy accumulating capacitor C becomes zero after discharging, each reverse conductive type semiconductor switch can be turned off by zero voltage, and when such switch is turned on, because of the presence of the inductor Lac, a current does not rise rapidly, so that such switch can be turned on by zero current, resulting in accomplishment of zero-current/zero-voltage switching.

Likewise, when the input power source is DC power, the higher the high speed on/off control frequency is and/or the higher the on duty of the on/off time ratio (duty ratio) is, the higher the boosting pulse voltage between the DC terminals DC(P) and DC(N) becomes, and as the high speed on/off control frequency and/or the on/off time ratio (duty ratio) is successively changed, the boosting pulse voltage between the DC terminals DC(P) and DC(N) can be successively changed, thereby successively changing a voltage at the input voltage side with reference to the DC bus bar. When the voltage at the input voltage side with reference to the DC bus bar is higher than the voltage of the DC bus bar, a current flows from the input voltage side to the DC bus bar side, and conversion from DC to DC is performed. Conversely, when the voltage at the input voltage side with reference to the DC bus bar is lower than the voltage of the DC bus bar, a current flows from the DC bus bar side to the input voltage side, and the direction of the current is inverted.

When the direction of the current of the DC power is the forward direction from the source A to the source B, for example, only a pair of SW2, SW4 is subjected to a high speed on/off operation, and the other pair of SW1, SW3 is always maintained in off state, and only a diode for reverse conduction operates, but when the direction of the current is inverted, i.e., when the current flows from the DC bus bar side to the input voltage side to perform inversion, the individual pairs are interchanged in such a way that only a pair of SW1, SW3 is subjected to a high speed on/off operation, the other pair of SW2, SW4 is always maintained in off state and only a diode for reverse conduction operates. Interchanging can be carried out by detecting the direction of the current from the source A connected to the AC terminals AC, AC of the bridge circuit or a voltage difference between the voltage of the input voltage side with reference to the DC bus bar side and the voltage of the DC bus bar. Accordingly, because of successive changing at a range across the high speed on/off control frequency that the voltage at the input voltage side with reference to the DC bus bar side and the voltage of the DC bus bar are balanced and/or the on/off time ratio (duty ratio), the flow of power between the input power source and the DC bus bar can be successively changed to, for example, large-current conversion, small-current conversion, zero (no power conversion), small-current inversion, and large-current inversion.

In the case in which the input power source is DC power with a 100 V voltage, when the simulation circuit shown in FIG. 2 is used, it is not illustrated in the figure but the DC load voltage is boosted to 680 V or so. Also the load voltage can be successively lowered and set to be a desired value by reducing the frequency of the high speed on/off operation and/or the on/off time ratio (duty ratio of on part).

Therefore, the electric-vehicle charging device comprising the power converter using the Magnetic Energy Recovery Switch (MERS) can charge a secondary battery (battery) of 200 V or 400 V using a 100 V DC power source, such as a sufficiently-charged 100 V secondary battery (battery) or a auxiliary 100 V secondary battery (battery), as an input power source. Moreover, without changing the connection of the secondary battery (battery), as inversion, the electric-vehicle charging device can also charge a 100 V secondary battery (battery) or a auxiliary 100 V secondary battery (battery) from a secondary battery of 200 V or 400 V. When the input power source is, for example, a secondary battery (battery) of 12 V or 24 V, a secondary battery (battery) of 200 V or 400 V can be charged by increasing the frequency of the high speed on/off operation with the power converter using the Magnetic Energy Recovery Switch (MERS). The same is true for inversion. When the high speed on/off control frequency is set to be lower than the resonance frequency set based on the capacitance (C) of the magnetic energy accumulating capacitor C and the inductance (Lac) of the inductor Lac for both conversion and inversion, the switching operation always becomes soft switching with zero current and zero voltage, power conversion loss is little, and basically, no high-frequency noises inherent to switching is generated.

According to the foregoing power converter, the Magnetic Energy Recovery Switch (MERS) comprises the bridge circuit including the four reverse conductive type semiconductor switches SW1 to SW4, and the magnetic energy accumulating capacitor C connected between the DC terminals DC(P) and DC(N) of the bridge circuit, but the Magnetic Energy Recovery Switch (MERS) may employ following configurations.

Figure 7:
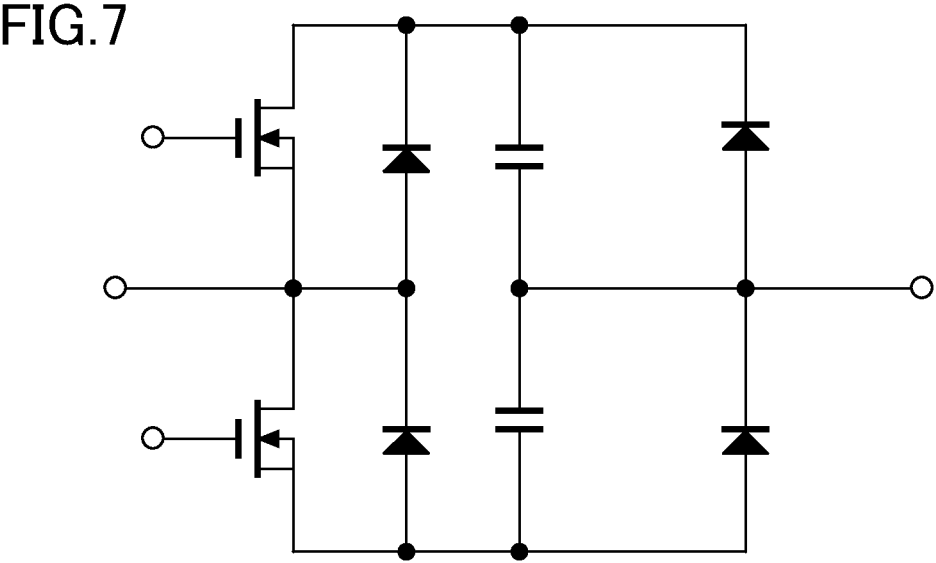
FIG. 7 is a circuit diagram showing another configuration of Magnetic Energy Recovery Switch (MERS)
Figure 8:
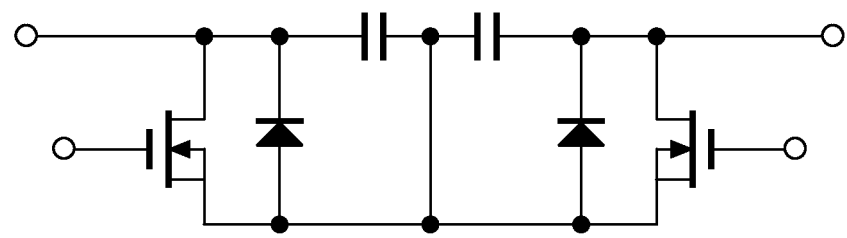
FIG. 8 is a circuit diagram showing the other configuration of Magnetic Energy Recovery Switch (MERS).

FIGS. 7 and 8 are diagrams showing other configurations of the Magnetic Energy Recovery Switch (MERS). A Magnetic Energy Recovery Switch (MERS) shown in FIG. 7 is a vertical half-bridge-type Magnetic Energy Recovery Switch (MERS) comprising two reverse conductive type semiconductor switches, two diodes, and two magnetic energy accumulating capacitors C, in comparison with the full-bridge-type Magnetic Energy Recovery Switch (MERS) comprising the four reverse conductive type semiconductor switches SW1 to SW4 and the magnetic energy accumulating capacitor C.

More specifically, the vertical half-bridge-type Magnetic Energy Recovery Switch (MERS) includes two reverse conductive type semiconductor switches connected in series, two magnetic energy accumulating capacitors C arranged in parallel with the two reverse conductive type semiconductor switches and connected in series with each other, and two diodes connected in parallel with the two magnetic energy accumulating capacitors C.

A Magnetic Energy Recovery Switch (MERS) shown in FIG. 8 is a horizontal half-bridge-type Magnetic Energy Recovery Switch (MERS). The horizontal half-bridge-type Magnetic Energy Recovery Switch (MERS) comprises two reverse conductive type semiconductor switches and two magnetic energy accumulating capacitors C.

More specifically, the horizontal half-bridge-type Magnetic Energy Recovery Switch (MERS) has two reverse conductive type semiconductor switches connected with each other in an anti-series manner, and two magnetic energy accumulating capacitors C connected in series with each other, the two reverse conductive type semiconductor switches and the two magnetic energy accumulating capacitors C are connected in parallel with each other, and a wiring interconnects a middle point between the two reverse conductive type semiconductor switches and a middle point between the two magnetic energy accumulating capacitors.

Figure 5:
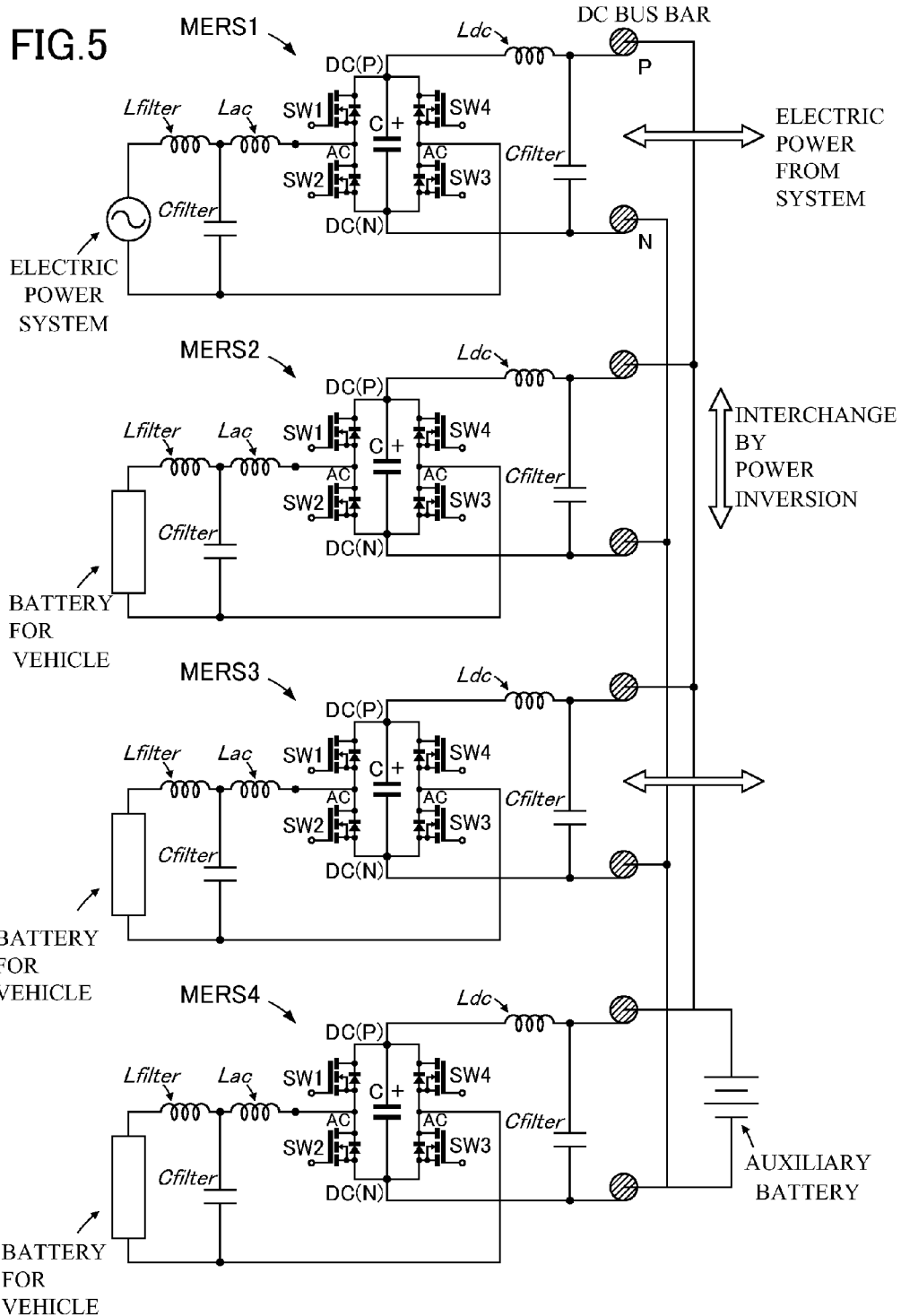
FIG. 5 is a diagram showing a system which interchanges power among multiple charging devices and among AC systems.

FIG. 5 shows a charging station which comprises the electric-vehicle charging devices each using the foregoing power converter and which can simultaneously charge large number of electric vehicle secondary batteries (batteries). An MERS1 is connected between an AC power source like a 100 V power system commercially-available in Japan and a DC bus bar of the electric-vehicle charging device, is used as an AC/DC power converter, and performs conversion from the power system to the DC bus bar and inversion from the DC bus bar to the power system. MERS2, MERS3, and MERS4 are each having DC terminals DC(P) and DC(N) connected to terminals P, N of the bus bar of the electric-vehicle charging device, respectively, and each having AC terminals AC and AC that can be connected to respective electric-vehicle secondary batteries (batteries). It is illustrated as an example case in which three MERS are present, but the number of MERS can be one, two, or greater than or equal to four. The secondary batteries (batteries) connected to respective MERS2, MERS3, MERS4 may have the same voltage or different voltages. For example, the voltage of the DC bus bar may be 110 V, a 48 V secondary battery (battery), a 72V secondary battery (battery), and a 24V secondary battery (battery) may be connected to the MERS2, the MERS3, and the MERS4, respectively.

In order to connect a high-voltage secondary battery (battery) of 200 V or 400 V, the bus-bar voltage of the DC bus bar can be set to a high voltage like 400 V, but it is no problem if the voltage of the DC bus bar is, for example, 110 V. For example, when the DC bus-bar voltage is 110 V, if a secondary battery (battery) having a voltage higher than the DC bus-bar voltage like 200 V or 400 V is connected to the MERS2 instead of a secondary battery (battery) of 48 V, the connection of the MERS2 may be reversed in such a way that the AC terminals AC, AC of the MERS2 is connected to the DC bus bar and the DC terminals DC(P), DC(N) are connected to the secondary battery (battery) of 200 V or 400 V. Regarding connection of the other MERS3 and MERS4, as explained above, respective DC terminals DC(P), DC(N) may be connected to the terminals P, N of the DC bus bar and respective AC terminals AC, AC may connected to a secondary battery (battery). That is, the AC terminals AC, AC of the Magnetic Energy Recovery Switch (MERS) or the DC terminals DC(P), DC(N) thereof can be connected to the DC bus bar.

A auxiliary secondary battery (battery) corresponding to the DC bus-bar voltage may be connected to the DC bus bar as a buffer.

The gates of reverse conductive type semiconductor switches in each Magnetic Energy Recovery Switch (MERS) are controlled by a gate control device (not shown) corresponding to each Magnetic Energy Recovery Switch (MERS), and each gate control device is controlled by a central control unit (not shown). According to such a structure, the central control unit can manage and control the voltage of each secondary battery (battery), the current thereof, and the charging/discharging amount thereof.

Regarding how to control, for example, when a certain electric-vehicle secondary battery (battery) must be charged rapidly, power inversion is performed from the large number of other secondary batteries (batteries) and auxiliary secondary batteries (batteries) which have been already charged or almost charged while monitoring a voltage and a current at a power receiving point of the system, and the secondary battery (battery) which must be charged rapidly can be charged with the aid of the inverted power. Accordingly, it is possible to reduce the peak value of received power from an external commercially-available power source. Moreover, it is possible to measure the temperature of a casing of each secondary battery (battery) and to suppress any charging when the temperature of a certain secondary battery (battery) is higher than or equal to a predetermined temperature.

When the system has a power interruption in charging, charging is once suppressed, and power can be supplied to the system, so that the charging station can function as an uninterruptible power source. Moreover, when conversion is performed from AC power of the system to DC power for the charging bus bar, an AC/DC power converter using the Magnetic Energy Recovery Switch (MERS) can be used. The power factor of an AC current can be shifted as "leading", it is anticipated that the current power factor at a power receiving point is improved. When the power factor of a current is set to 1, the current effective value decreases and Joule loss decreases, and it is anticipated on a short-period basis that a voltage at a power receiving point is controlled. According to a current having a poor power factor when the charging device receives large power, voltage drop at a power receiving point is unavoidable, but according to the AC/DC power converter using the Magnetic Energy Recovery Switch (MERS), leading currents can be generated and the voltage at a power receiving point can be increased.

Figure 6:
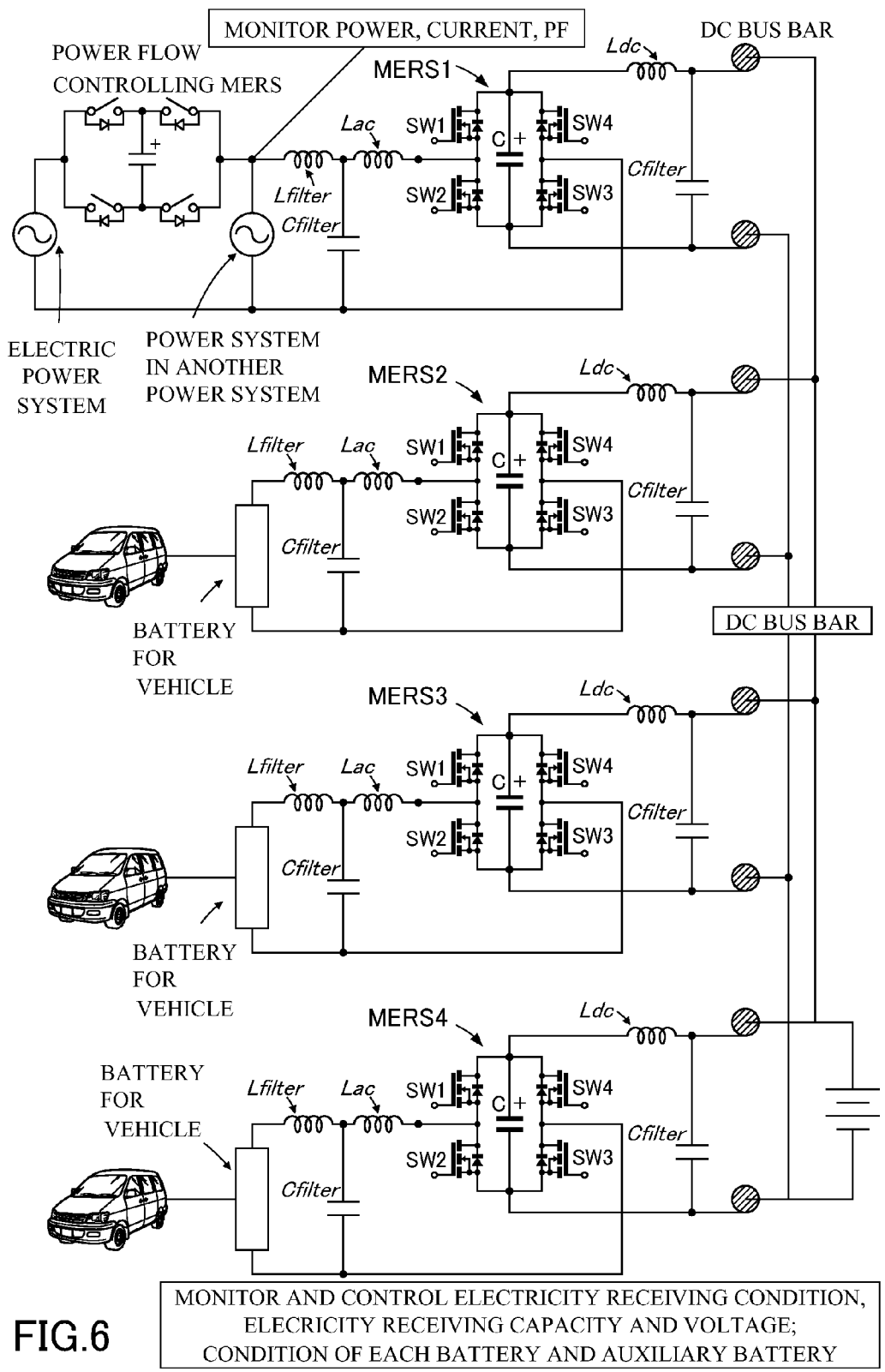
FIG. 6 is a configuration diagram of a system in which a power-flow control Magnetic Energy Recovery Switch (MERS) is arranged at a power receiving point to maintain a voltage of an intraregional power system.

FIG. 6 shows the charging station further comprising a power-flow controlling MERS provided between the MERS 1 which converts AC power to DC power and the power system. An example of the power-flow controlling MERS is one disclosed in patent literature 7.

The charging/discharging device of the present invention contributes to comprehensive stabilization of power. That is, when, for example, precipitous power variation from a photovoltaic unit in the system is to be reduced, it is anticipated that a secondary battery (battery) in charging functions to realize complemental operation so as to reduce such power variation. Such a function can be realized because the charging device can be operated with a large degree of freedom.

It is anticipated that the charging station which can simultaneously charge a large number of vehicles using the large number of charging devices has a function of rapid charging ten time or so as much as the conventional charging stations. In order to perform charging in a short time without increasing power according to power reception contract, as shown in FIG. 3, it is probable to cope with such rapid charging by arranging a auxiliary secondary battery (battery) at the DC bus bar. As charging/discharging is performed between secondary batteries (batteries), power reception from the power system is subjected to smoothing to an average value, but if there are plural secondary batteries (batteries) standby or while charging in the charging station without the auxiliary secondary battery (battery), rapid charging can be performed by acquiring power from such secondary batteries (batteries).

Moreover, the charging/discharging device of the present invention can be equipped with a control device that exchange information to the exterior through a LAN and power reception contract can be made in such a manner as to select, in particular, inexpensive power having a poor power quality.

In particular, wind electricity is an undesirable power source to the system because it brings power variation at night, so that charging power can be changed by receiving wind power generation information in order to compensate such power variation. It is significant that electric power companies assume charging power at night for electric vehicles in order to control the frequency. This is advantageous for both electric power companies and owners of the charging/discharging devices.

The same is true for voltage controlling, and if the charging/discharging device is always in operation, voltage control at a power receiving point becomes possible as the Magnetic Energy Recovery Switch (MERS) shifts the AC current of the charging/discharging device as "leading". It is conventionally difficult to accomplish such voltage control at the same time, but the charging/discharging device of the present invention using the Magnetic Energy Recovery Switch (MERS) can newly realize such voltage control. When electricity failure happens during charging, the DC/AC power converter using the Magnetic Energy Recovery Switch (MERS) which can perform inversion can be driven by power from a secondary battery (battery), and it is possible to assume that a power-supply area employs a configuration with an uninterruptible power source, so that it becomes possible to supply AC power.

When a voltage at a power receiving point decreases due to earth fault, short-circuiting, or the like of the power system, if the AC/DC power converter of the present invention with the Magnetic Energy Recovery Switch (MERS) which can perform inversion performs an inversion operation to maintain a voltage across a power-supply area, a current flows in the system, so that the voltage across the power-supply area cannot be maintained. Accordingly, as shown in FIG. 4, the Magnetic Energy Recovery Switch (MERS) disclosed in patent literature 5 is arranged at a power receiving point as an AC bidirectional switch, and gate controlling is performed in such a way that a current flows in a direction (forward direction) from the power system to the power system in the power-supply area. Accordingly, the switch becomes in a high-impedance condition against a reverse current, and it is not necessary to detect a voltage and to deactivate the gate of the reverse conductive type semiconductor switch in the Magnetic Energy Recovery Switch (MERS), so that it is possible to cope with rapid voltage drop of three cycles or so.

If the electric-vehicle charging device becomes an electrical equipment with the maximum capacity at home, controlling thereof dramatically changes electrical power circumstance at home. For example, it is expected that everyone must increase contracted power reception amount inherent to installation of the electric-vehicle charging device, and the basic rate of power reception contract becomes expensive in comparison with conventional rates. When an electric vehicle is run once per week for 20 km or so, a total mileage per month becomes 80 km or so, and power of 14 kWh or so is sufficient to a small electric vehicle in this case. Accordingly, the electricity expense is merely 336 YEN when 24 YEN/kWh.

One of the attractions of electric vehicles is that electricity expense becomes further inexpensive if night electrical power is used, but the charging device has a 1 kW capacity in order to complete charging for 14 hours. Increasing of the contracted electrical power energy by 1 kW results in increasing of the electricity expense by 1071 YEN in the case of low-voltage power. Increasing by 1 kW results in increasing of the electricity expense by 300 YEN or so in the case of power for home, and it is nonnegligible. Accordingly, realized by the present invention is a reasonable charging/discharging device which receives power just until a breaker is tripped in consideration of a current history at a power receiving point but which utilizes power of the charging device and a current power factor as adjustment factors. When a large number of electric vehicles are connected in parallel and charged at a business place, it is necessary to perform demand management in accordance with a power reception contract. According to the present invention, the system can utilize electric energy efficiently and dynamically.

The present invention is not limited to the foregoing embodiment, and can be changed and modified in various forms based on the knowledge of those skilled in the art, and it should be understood that such modified embodiments are included within the scope of the present invention.

The invention claimed is:

1. A power converter which converts AC power to DC power or vice versa, the power converter comprising:
   Magnetic Energy Recovery Switch comprising a bridge circuit including four reverse conductive type semiconductor switches and a magnetic energy accumulating capacitor C which accumulates magnetic energy possessed by a current at the time of current cutoff and which is connected between DC terminals DC(P), DC(N) of the bridge circuit, and wherein
   the power converter employs a circuit configuration in which an AC power source is connected between AC terminals AC, AC of the bridge circuit through a inductor Lac, and a DC power source or a load is connected between the DC terminals DC(P), DC(N) through a smoothing inductor Ldc, and wherein the power converter further comprises:
a gate control device which performs on/off control on the reverse conductive type semiconductor switches by supplying a control signal to a gate of each reverse conductive type semiconductor switch, the gate control device performing controlling in such a way that a pair of the reverse conductive type semiconductor switches on a diagonal line of the bridge is turned on, while at the same time, another pair of the reverse conductive type semiconductor switches is turned off, the gate control device also allowing a pair of the reverse conductive type semiconductor switches selected by a direction of a current from the AC power source to perform high speed on/off operation;
means for generating a boosted pulse voltage between the DC terminals DC(P), DC(N); and
means for allowing the boosted pulse voltage to flow in the DC power source, a secondary battery (battery) or the AC load through the smoothing inductor Ldc in order to smooth and convert the boosted pulse voltage to a DC voltage, and wherein
the power converter is connected to a secondary battery (battery) charging device in series or in parallel, or a series connection and a parallel connection is interchanged by an opening/closing switch, the secondary battery charging device controls charging conditions, such as a temperature of the secondary battery (battery) and a charging amount of the secondary battery, in a long term, shifts a power factor of an input current from a lagging power factor to a leading power factor in a short term, and adjusts a current power factor together with a lagging power factor of another power system to reduce the current, thereby reducing Joule loss and compensating voltage variation, overvoltage, and undervoltage at a power receiving point.

2. The power converter according to claim 1, wherein the Magnetic Energy Recovery Switch comprises a bridge circuit including two reverse conductive type semiconductor switches and two diodes opposite to the reverse conductive type semiconductor switches, and two magnetic energy accumulating capacitors each of which is connected to each of the two diodes in parallel, the magnetic energy accumulating capacitors being connected together in series.

3. The power converter according to claim 1, wherein the Magnetic Energy Recovery Switch comprises two reverse conductive type semiconductor switches connected in an anti-series connection manner, two magnetic energy accumulating capacitors connected together in series, the two reverse conductive type semiconductor switches and the two magnetic energy accumulating capacitors being connected in parallel, and a wiring interconnecting a middle point between the two reverse conductive type semiconductor switches and a middle point between the two magnetic energy accumulating capacitors.

4. The power converter according to any one of claims 1 to 3, wherein an on/off cycle of the Magnetic Energy Recovery Switch is set to be longer than a discharging time set based on a capacitance (C) of the magnetic energy accumulating capacitor C of the Magnetic Energy Recovery Switch and an inductance (Lac) of the inductor Lac thereof, a voltage of the Magnetic Energy Recovery Switch becomes zero by discharging for each cycle, zero voltage is accomplished when the reverse conductive type semiconductor switch turns off and zero current is accomplished when the reverse conductive type semiconductor switch turns on.

5. The power converter according to claim 1, wherein when the means for generating the boosting pulse voltage is a three-phase AC power source, the Magnetic Energy Recovery Switch employs a three-phase full wave bridge configuration by six reverse conductive type semiconductor switches with three arms of the bridge which are one in the case of single-phase AC, the magnetic energy accumulating capacitor C is connected between terminals P, N of a DC bus bar, the two reverse conductive type semiconductor switches in each arm in a current direction of three-phase AC are selected and all selected reverse conductive type semiconductor switches are simultaneously turned on/off at a high speed, and the boosting pulse voltage is generated between the terminals P, N of the DC bus bar, thereby performing conversion of three-phase AC power.

6. The power converter according to claim 1, wherein when the input power source is a DC voltage, only a pair of the reverse conductive type semiconductor switches on a diagonal line of the Magnetic Energy Recovery Switch is turned on/off at a high speed, but another pair of the reverse conductive type semiconductor switches is always maintained in off state to function as a diode for reverse conduction, a direction of the current is reversed, thereby inverting power from the secondary battery (battery) to AC.

7. The power converter according to claim 1, further comprising a control device wherein a magnitude and a direction of an input voltage of the Magnetic Energy Recovery Switch, a magnitude and a direction of an input current of the Magnetic Energy Recovery Switch, a voltage and a current of a DC output or an AC output, and a voltage of the magnetic energy accumulating capacitor are input, and the control device, in consideration of an on/off time ratio of a gate pulse signal to be applied to the reverse conductive type semiconductor switch, and a switch cycle thereof, protects the reverse conductive type semiconductor switch and performs on/off control thereof.

8. The power converter according to claim 1, wherein when power inversion is unnecessary, the power converter comprises a diode instead of the smoothing inductor Ldc for pulse pulsation, prevents a reverse current to an output capacitor, and performs zero-voltage/zero-current switching in which the reverse conductive type semiconductor switch is turned off at zero voltage and the reverse conductive type semiconductor switch is turned on at zero current.

9. A power converter comprising Magnetic Energy Recovery Switch, the Magnetic Energy Recovery Switch including:
a bridge circuit comprising four reverse conductive type semiconductor switches;
a magnetic energy accumulating capacitor C connected between DC terminals of the bridge circuit, and accumulating magnetic energy possessed by a current at the time of current cutoff; and
a gate control device which applies a control signal to a gate of each reverse conductive type semiconductor switch, and which performs controlling in such a way that a pair of the reverse conductive type semiconductor switches on a diagonal line of the bridge circuit is turned on, while at the same time, another pair of the reverse conductive type semiconductor switches is turned off, and wherein:
an AC terminal of the bridge circuit is connected to an AC or DC input power source through a inductor Lac;
a DC terminal of the bridge circuit is connected to a DC output power source through a smoothing inductor Ldc;
the gate control device causes a pair of the reverse conductive type semiconductor switches selected based on a direction of a current from the input power source to perform on/off operation at a high speed, and causes another pair of the reverse conductive type semiconductor switches to turn off, thereby generating a boosted pulse voltage between DC terminals of the bridge circuit;

the smoothing inductor Ldc smooths the boosted pulse voltage to convert the boosted pulse voltage into a DC voltage; and the high speed on/off operation synchronizes a high speed on/off control frequency lower than a resonance frequency of the bridge circuit set based on a capacity of the magnetic energy accumulating capacitor C and an inductance (Lac) of the inductor Lac, and a flow of a power between the input power source and the DC output power source is controlled by changing the high speed on/off control frequency and/or an on/off time ratio.

10. The power converter according to claim 9, wherein when the input power is AC, said pair of reverse conductive type semiconductor switches selected according to the current direction of said input power source and performing the high speed on/off operation is alternated in sync with the frequency of said AC voltage each time the current direction is altered.

11. The power converter according to claim 9, wherein when the input voltage is DC, only one of said pairs of reverse conductive type semiconductor switches is selected according to the current direction of said input power source and performs the high speed on/off operation and the other pair is normally turned off.

12. A power converter comprising:

first Magnetic Energy Recovery Switch including a first bridge circuit consisting of four first reverse conductive type semiconductor switches, a first magnetic energy accumulating capacitor C connected between the DC terminals DC (P), DC (N) of the bridge circuit for accumulating the magnetic energy held by the current at the time of current cutoff, and a first gate control device supplying control signals to the gates of said first reverse conductive type semiconductor switches for turning on/off said first reverse conductive type semiconductor switches; and second Magnetic Energy Recovery Switch including a second bridge circuit consisting of four second reverse conductive type semiconductor switches, a second magnetic energy accumulating capacitor C connected between the DC terminals DC (P), DC (N) of the bridge circuit for accumulating the magnetic energy held by the current at the time of current cutoff, and a second gate control device supplying control signals to the gates of said second reverse conductive type semiconductor switches for turning on/off said second reverse conductive type semiconductor switches, wherein the AC terminals AC, AC of said first bridge circuit can be connected to an AC power source via a first inductor Lac, the DC terminals DC (P), DC (N) of said first bridge circuit are connected to a DC bus bar via a first smoothing inductor Ldc, either the AC terminals AC, AC of said second bridge circuit or the DC terminals DC (P), DC (N) of said second bridge circuit are connected to said DC bus bar via a second inductor Lac or via a second smoothing inductor Ldc, and the other terminals can be connected to a secondary battery, said first and second gate control devices allow one of said pairs of reverse conductive type semiconductor switches that is selected according to the current direction of the input power source to perform high speed on/off operation and turn off the other pair of reverse conductive type semiconductor switches so as to generate a boosted pulse voltage at said DC terminals of the corresponding one of said bridge circuits, said smoothing inductor Ldc smoothes and converts said boosted pulse voltage to a DC voltage, in said high speed on/off operation of said first Magnetic Energy Recovery Switch, said pairs of reverse conductive type semiconductor switches, which are selected according to the current direction of said input power source and perform the high speed on/off operation in sync with a first high speed on/off control frequency lower than the resonant frequency of said first bridge circuit and determined by the capacitance (C) of said first magnetic energy accumulating capacitor C and the inductance (Lac) of said first inductor Lac, are alternated in sync with the frequency of said AC voltage, and said first high speed on/off control frequency and/or the on/off time ratio is changed to control the power flow between said AC power source and DC bus bar, and in said high speed on/off operation of said second energy recovery switch, only one of said pairs of reverse conductive type semiconductor switches is selected according to the current direction of said input power source and performs the high speed on/off operation in sync with a second high speed on/off control frequency lower than the resonant frequency of said second bridge circuit and determined by the capacitance (C) of said second magnetic energy accumulating capacitor C and the inductance (Lac) of said second inductor Lac, and the other pair is normally turned off, and said second high speed on/off control frequency and/or the on/off time ratio is changed to control the power flow between said DC bus bar and secondary battery.

13. The power converter according to claim 12, wherein a plurality of said second Magnetic Energy Recovery Switch is connected to said DC bus bar and a plurality of secondary batteries can be connected via each of said second Magnetic Energy Recovery Switch.

14. The power converter according to claim 13, including both said second Magnetic Energy Recovery Switch in which the AC terminals AC, AC of said second bridge circuit are connected to said DC bus bar via said second inductor Lac and said second Magnetic Energy Recovery Switch in which the DC terminals DC (P), DC (N) of said second bridge circuit are connected to said DC bus bar via said second smoothing inductor Ldc.

15. The power converter according to any one of claims 9 and 12 to 14, wherein said high speed on/off control frequency is increased and/or the on time ratio in the on/off control is increased for conversion from the input power source connected to the AC terminals AC, AC of said bridge circuit, first bridge circuit, and/or second bridge circuit to the output power source connected to the DC terminals DC (P), DC (N) of said bridge circuit, first bridge circuit, and/or second bridge circuit.

16. The power converter according to claim 1, wherein at a charging station capable of simultaneously charging a number of secondary batteries, a central control device administrating and controlling the charged amounts of individual secondary batteries is provided, inversion from a number of charging secondary batteries is conducted, the inverted electric power is collected to charge a specific secondary battery in need of quick charging, thereby lowering the peak value of power received from an external source.

17. The power converter according to claim 1, wherein when the charging device charging secondary batteries includes a significantly fluctuating power generator such as a solar power generator and wind power generator in its system, the battery charging device utilizes the power/voltage fluctuation as a variable absorption element.

18. The power converter according to any one of claim 1, wherein said Magnetic Energy Recovery Switch is provided at a connection point to a power system for preventing reverse power flows, whereby when the system undergoes an abnormal event such as temporal system voltage drop, high impedance due to a reversed phase current causes automatic cutoff for stabilizing the region's power/voltage.

* * * * *